US011777611B2

(12) United States Patent
Gui et al.

(10) Patent No.: US 11,777,611 B2
(45) Date of Patent: Oct. 3, 2023

(54) COHERENT OPTICAL RECEIVING APPARATUS AND OPTICAL SYSTEM THAT USES COHERENT OPTICAL RECEIVING APPARATUS

(71) Applicant: Huawei Technologies Co., Ltd., Shenzhen (CN)

(72) Inventors: Tao Gui, Dongguan (CN); Liangchuan Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/853,067

(22) Filed: Jun. 29, 2022

(65) Prior Publication Data

US 2022/0345224 A1 Oct. 27, 2022

Related U.S. Application Data

(63) Continuation of application No. PCT/CN2020/117043, filed on Sep. 23, 2020.

(30) Foreign Application Priority Data

Dec. 31, 2019 (CN) .......................... 201911414636.X

(51) Int. Cl.
*H04B 10/00* (2013.01)
*H04B 10/61* (2013.01)
*H04B 10/2575* (2013.01)
*H04J 14/00* (2006.01)

(52) U.S. Cl.
CPC ..... *H04B 10/614* (2013.01); *H04B 10/25759* (2013.01); *H04B 10/6151* (2013.01)

(58) Field of Classification Search
CPC .. H04B 10/613; H04B 10/614; H04B 10/615; H04B 10/6151; H04B 10/616; H04B 10/6162; H04B 10/6166
See application file for complete search history.

(56) References Cited

U.S. PATENT DOCUMENTS 6,917,031 B1   7/2005  Sun et al.
8,014,685 B2   9/2011  Hoshida
(Continued)

FOREIGN PATENT DOCUMENTS

CN   101207444 A   6/2008
CN   101369851 A   2/2009
(Continued)

*Primary Examiner* — Daniel G Dobson
(74) *Attorney, Agent, or Firm* — Slater Matsil, LLP

(57) ABSTRACT

A coherent optical receiving apparatus including a polarization optical splitter, a polarization controller, an optical hybrid unit, and a combiner. The polarization optical splitter is connected to an input terminal of the optical hybrid unit, and an output terminal of the optical hybrid unit is connected to the combine. The polarization optical splitter receives signal light and local oscillator light in any polarization mode, decomposes the signal light into a plurality of beams of sub signal light, and decomposes the local oscillator light into a plurality of beams of sub local oscillator light. The optical hybrid unit obtains a plurality of beams of hybrid light by performing optical hybridization on the sub signal and sub local oscillator lights, the combiner performs conversion on the plurality of beams of hybrid light to obtain and output coherent electrical signals, and the polarization controller controls polarization of the local oscillator light.

20 Claims, 10 Drawing Sheets

(56) References Cited

U.S. PATENT DOCUMENTS

| | | |
|---|---|---|
| 8,406,638 B2 | 3/2013 | Hoshida |
| 9,819,420 B2 | 11/2017 | Wen et al. |
| 10,050,713 B2 | 8/2018 | Li et al. |
| 10,126,572 B2 | 11/2018 | Zhang et al. |
| 10,135,543 B2 | 11/2018 | Yao et al. |
| 10,338,316 B2 | 7/2019 | Nakano |
| 10,735,104 B2 | 8/2020 | Razzell |
| 2017/0099110 A1 | 4/2017 | Ogawa |
| 2017/0285373 A1 | 10/2017 | Zhang et al. |
| 2018/0278338 A1* | 9/2018 | Jensen ............... H04B 10/616 |
| 2019/0260476 A1* | 8/2019 | Shen ................ H04B 10/615 |
| 2021/0367679 A1 | 11/2021 | Zhao et al. |

FOREIGN PATENT DOCUMENTS

| | | |
|---|---|---|
| CN | 101753252 A | 6/2010 |
| CN | 102142901 A | 8/2011 |
| CN | 104767570 A | 7/2015 |
| CN | 104780037 A | 7/2015 |
| CN | 105071894 A | 11/2015 |
| CN | 105589506 A | 5/2016 |
| CN | 106797251 A | 5/2017 |
| CN | 107408991 A | 11/2017 |
| CN | 107643120 A | 1/2018 |
| CN | 110460386 A | 11/2019 |
| WO | 0227994 A1 | 4/2002 |
| WO | 2019049030 A1 | 3/2019 |
| WO | 2020211390 A1 | 10/2020 |

\* cited by examiner

COHERENT OPTICAL RECEIVING APPARATUS AND OPTICAL SYSTEM THAT USES COHERENT OPTICAL RECEIVING APPARATUS

CROSS-REFERENCE TO RELATED APPLICATIONS

This application is a continuation of International Application No. PCT/CN2020/117043, filed on Sep. 23, 2020, which claims priority to Chinese Patent Application No. 201911414636.X, filed on Dec. 31, 2019. The disclosures of the aforementioned applications are hereby incorporated by reference in their entireties.

TECHNICAL FIELD

This application relates to the field of optical communication, and in particular, to a coherent optical receiving apparatus and an optical system that uses the coherent optical receiving apparatus.

BACKGROUND

A coherent optical transmission technology is widely used due to a large transmission capacity and a long transmission distance. At a receive end of a coherent optical communication system, local oscillator light and signal light are input to an optical hybrid apparatus for optical hybridization, output light obtained through optical hybridization is converted into an electrical signal, and amplitude and phase information of the signal light may be obtained through sampling, analog-to-digital conversion, and digital signal processing, to implement a decoding function.

Currently, local oscillator light with a fixed polarization state needs to be input into an optical hybrid apparatus in a coherent optical receiver used in the industry. Because this special requirement for the polarization state of the local oscillator light cannot be satisfied in a network such as a data center network (DCN), the optical hybrid apparatus currently used in the industry cannot normally work. Finally, the coherent optical transmission technology cannot be applied to an application scenario of the network such as the DCN. Consequently, universality of the coherent optical transmission technology is relatively poor.

SUMMARY

In view of this, an embodiment of this application provides a coherent optical receiving apparatus, to resolve a problem that a receiver cannot normally work due to a random change of a polarization state of local oscillator light.

According to a first aspect, an embodiment of this application discloses a coherent optical receiving apparatus, where the coherent optical receiving apparatus includes an optical splitting unit, a polarization control unit, an optical hybrid unit, and a combiner unit, where the polarization optical splitting unit is connected to an input terminal of the optical hybrid unit, and an output terminal of the optical hybrid unit is connected to the combiner unit, the optical splitting unit is configured to receive signal light and local oscillator light in any polarization mode, and decompose the signal light into a plurality of beams of sub signal light, and decompose the local oscillator light into a plurality of beams of sub local oscillator light, the optical hybrid unit is configured to perform optical hybridization on the obtained sub signal light and the obtained sub local oscillator light, to obtain a plurality of beams of hybrid light, the combiner unit is configured to perform optical-to-electrical conversion on the plurality of beams of hybrid light to obtain and output a plurality of coherent electrical signals, and the polarization control unit is configured to control polarization of the local oscillator light, so that a first digital signal processor (DSP) obtains service data based on the plurality of coherent electrical signals.

According to a second aspect, an embodiment of this application discloses a polarization control method, where the method includes obtaining a part of local oscillator light through division, and performing beam splitting on the part of local oscillator light to obtain a plurality of beams of optical supervisory signals, converting the plurality of beams of optical supervisory signals into a plurality of beams of electrical supervisory signals, and generating feedback control electrical signals based on the plurality of beams of electrical supervisory signals, where the feedback control electrical signals are used to control the phase modulator to adjust polarization of the local oscillator light, so that a coherent optical receiving apparatus obtains service data.

According to a third aspect, an embodiment of this application discloses an optical system, where the system includes an optical sending device, an optical fiber, and any coherent optical receiving apparatus in the first aspect, the coherent optical receiving apparatus receives, by using the optical fiber, signal light sent by the optical sending device, and that the coherent optical receiving apparatus receives local oscillator light or the coherent optical receiving apparatus generates the local oscillator light specifically includes the coherent optical receiving apparatus receives, by using the optical fiber, the local oscillator light sent by the optical sending device, or the coherent optical receiving apparatus generates the local oscillator light.

BRIEF DESCRIPTION OF THE DRAWINGS

To describe the technical solutions in embodiments of this application or in the conventional technology more clearly, the following briefly describes the accompanying drawings required for describing the background and embodiments. Apparently, the accompanying drawings in the following descriptions show merely some embodiments of this application, and a person of ordinary skill in the art may still derive other accompanying drawings or embodiments according to these drawings or descriptions without creative efforts, and this application is intended to cover all these derived accompanying drawings or embodiments.

DETAILED DESCRIPTION OF ILLUSTRATIVE EMBODIMENTS

Figure 1A:
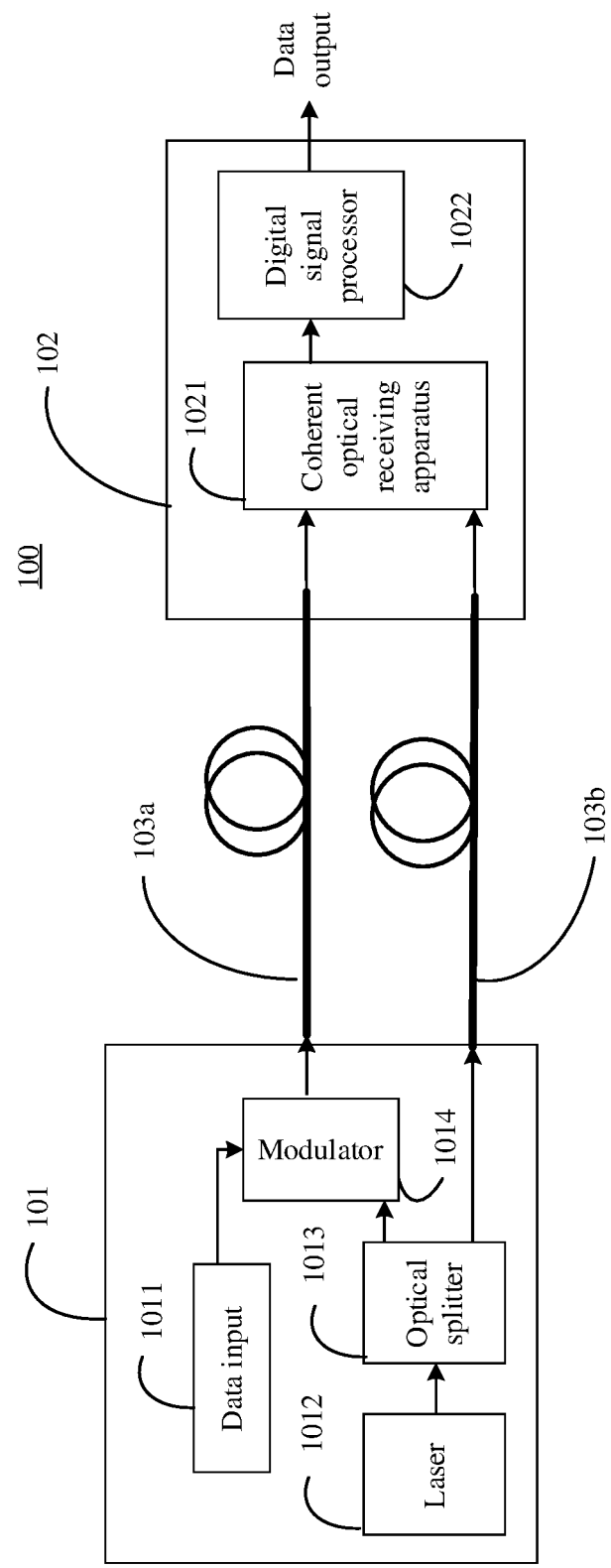
FIG. 1a is a schematic diagram of a possible application scenario to which an embodiment of this application is applicable.

A device form and a service scenario that are described in embodiments of this application are intended to describe technical solutions in embodiments of the present invention more clearly, and do not constitute a limitation on the technical solutions provided in embodiments of the present invention. A person of ordinary skill in the art may learn that, as the device form evolves and a new service scenario appears, the technical solutions provided in embodiments of this application are also applicable to a similar technical problem.

The following describes some terms in embodiments of this application to help understanding of a person skilled in the art.

(1) Coherent light is an optical signal with a determined frequency and phase. Generally, the coherent light may be laser beams that have spatial superposition and mutual interference characteristics and that are generated by a laser.

(2) A coherent optical transmission system, also referred to as a coherent optical communication system, is an optical fiber communication system. The coherent optical transmission system uses a single-frequency coherent light source and carries more modulation information by using parameters in a plurality of dimensions of light, such as a phase, a frequency, and an amplitude, to fully use an optical fiber bandwidth and implement ultra-high capacity transmission. A basic structure of the coherent optical transmission system includes an optical transmitter, an optical fiber, an optical receiver, and the like. An optical reflector is configured to modulate a signal that needs to be transmitted out onto an optical carrier to meet a requirement of optical transmission. Amplitude, frequency, and phase modulation may be performed on the optical carrier in a manner of direct modulation or external modulation. The optical receiver is configured to perform coherent detection on signal light, and improve receiving sensitivity by detecting a difference between local oscillator light and the signal light. Herein, the signal light is an optical signal transmitted in the coherent optical transmission system, and the local oscillator light is a laser beam generated by a local oscillator on the receiver side.

A coherent optical receiving apparatus and an optical signal demodulation apparatus provided in embodiments of this application are apparatuses applied to an optical receiver. The coherent optical receiving apparatus may be a front-end device in the optical receiver, or may be referred to as a coherent receiving front-end. The optical signal demodulation apparatus may be the optical receiver.

It should be understood that, in the following descriptions, terms such as "first" and "second" are merely used for a purpose of distinguishing for description, and should not be construed as indicating or implying relative importance, nor as indicating or implying a sequence. The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

The technical solutions provided in this application are applicable to different service scenarios, including but not limited to a backbone optical transmission network, an optical access network, data center interconnection, short-range optical interconnection, wireless service fronthaul/backhaul, and the like. Specifically, the technical solutions provided in this application may be used for receive side devices corresponding to the foregoing different networks, or an optical system including a receive side device.

FIG. 1a is a schematic diagram of a possible application scenario to which an embodiment of this application is applicable.

FIG. 1a shows a homologous coherent optical transmission system 100. The system 100 includes a transmit side device 101 and a receive side device 102, and optical fibers 103a and 103b connecting the two devices. The transmit side device 101 includes a data input 1011, a laser 1012, an optical splitter 1013, and a modulator 1014. Light output by the laser 1012 is divided into two parts by the optical splitter 1013. One part is modulated by the modulator 1014 to obtain signal light loaded with service data, and the other part is used as local oscillator light. The signal light and the local oscillator light generated by the transmit side device 101 are transmitted to the receive side device 102 by using the optical fibers 103a and 103b. The receive side device 102 includes a coherent optical receiving apparatus 1021 and a digital signal processor (DSP) 1022. The former receives the signal light and the local oscillator light, to implement coherent optical receiving. The latter processes an electrical signal output by the coherent optical receiving apparatus 1021 to obtain the service data. Both the signal light and the local oscillator light are generated by the transmit side device. Therefore, the system 100 is referred to as the homologous coherent optical transmission system. It should be noted that the signal light and the local oscillator light may be alternatively transmitted by using one optical fiber. It should be further noted that the DSP 1022 may be alternatively located in the coherent optical receiving apparatus 1021.

Figure 1B:
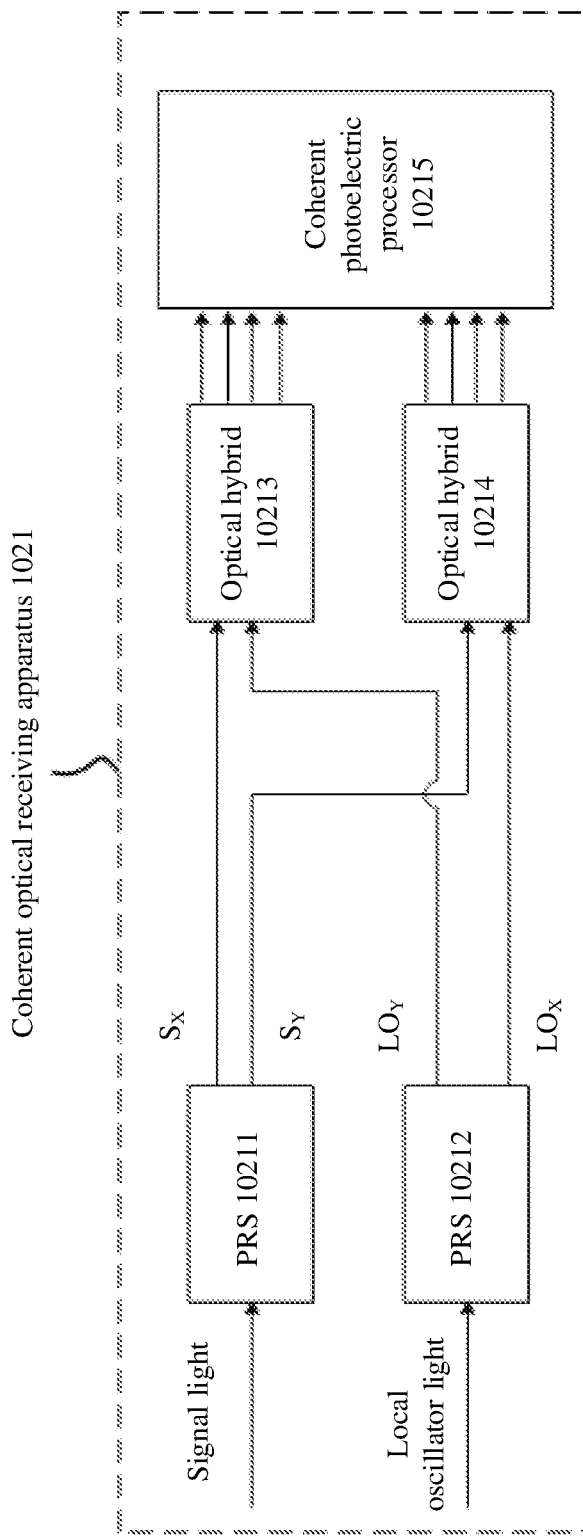
FIG. 1b is a schematic diagram of an existing coherent optical receiving apparatus 1021 according to this application.

FIG. 1b is a schematic diagram of an existing coherent optical receiving apparatus 1021 according to this application.

As shown in FIG. 1b, the coherent optical receiving apparatus 1021 includes a PSR 10211, a PSR 10212, an optical hybrid 10213, an optical hybrid 10214, and a coherent photoelectric processor 10215. The polarization beam splitter (PSR) 10211 performs polarization beam splitting on the input signal light to obtain $S_X$ and $S_Y$, that is, linearly polarized light in an X polarization state and linearly polarized light in a Y polarization state of the signal light. The PSR 10212 performs polarization beam splitting on the input local oscillator light to obtain $LO_X$ and $LO_Y$, that is, linearly polarized light in an X polarization state and linearly polarized light in a Y polarization state of the local oscillator light. The optical hybrid 10213 performs optical hybridization on $S_X$ and $LO_Y$ to obtain four beams of hybrid light and inputs the hybrid light to the coherent photoelectric processor 10215, and the optical hybrid 10214 performs optical hybridization on $S_Y$ and $LO_X$ to obtain four beams of hybrid light and inputs the hybrid light to the coherent photoelectric processor 10215. The coherent photoelectric processor 10215 performs coherent photoelectric processing on the eight beams of hybrid light to obtain a plurality of coherent electrical signals.

The signal light or the local oscillator light has two polarization modes: TE and TM, which are also usually referred to as the X polarization state and the Y polarization state. The X polarization state and the Y polarization state are orthogonal to each other. In other words, a beam in a single polarization state (the Y polarization state) turns into a beam in the X polarization state after polarization state rotation. An optical signal is polarized only in the X polarization state or in the Y polarization state, and is referred to as linearly polarized light.

The existing coherent optical receiving apparatus usually performs optical hybridization on the X polarization state of the signal light and the Y polarization state of the local oscillator light, and performs optical hybridization on the Y polarization state of the signal light and the X polarization state of the local oscillator light. When the polarization states of the signal light and the local oscillator light are both fixed, usually, the existing coherent optical receiving apparatus can normally work. However, when the polarization states of the signal light and the local oscillator light are both random, energy of the optical signal is very likely to be concentrated in one polarization state and there is almost no energy in the other polarization state. For example, if energy of the local oscillator light is concentrated in the X polarization state, and there is almost no energy in the Y polarization state of the local oscillator light, in the existing coherent optical receiving apparatus, normal optical hybridization cannot be performed on the X polarization state of the signal light and the Y polarization state of the local oscillator light. Then, the service data carried in the X polarization state of the signal light is missing. In an ideal case, a polarization maintaining optical fiber with a relatively high price can be used to prevent random deflection of the polarization state of the local oscillator light during transmission, to ensure that the coherent optical receiving apparatus normally obtains the service data. However, in an existing network, the optical fiber inevitably suffers from compression, reducing polarization maintaining performance of the polarization maintaining optical fiber. Consequently, performance of the coherent optical receiving apparatus is degraded (to be specific, a data receiving error occurs). Therefore, although the polarization maintaining optical fiber can be used to resolve the problem of random deflection of the polarization state of the local oscillator light to some extent, this solution increases costs of the coherent optical transmission system and leads to unstable performance.

To resolve the foregoing problem in the conventional technology, this application provides a new coherent optical receiving apparatus. An input of the coherent optical receiving apparatus is signal light and local oscillator light, and an output of the coherent optical receiving apparatus is an electrical signal. The output electrical signal includes service data, and final service data may be obtained by further processing the output electrical signal. Optionally, if the coherent optical receiving apparatus includes a DSP, an output of the coherent optical receiving apparatus is service data. The coherent optical receiving apparatus performs relatively precise phase control on the local oscillator light, so that two beams of local oscillator light with substantially the same power are used for coherent receiving related processing, thereby effectively avoiding a problem that a receiver cannot normally work due to a random change of a polarization state of the local oscillator light. By using the coherent optical receiving apparatus, a coherent optical transmission system can use a conventional optical fiber (that is, a non-polarization maintaining optical fiber) to implement normal coherent optical receiving.

Figure 2:
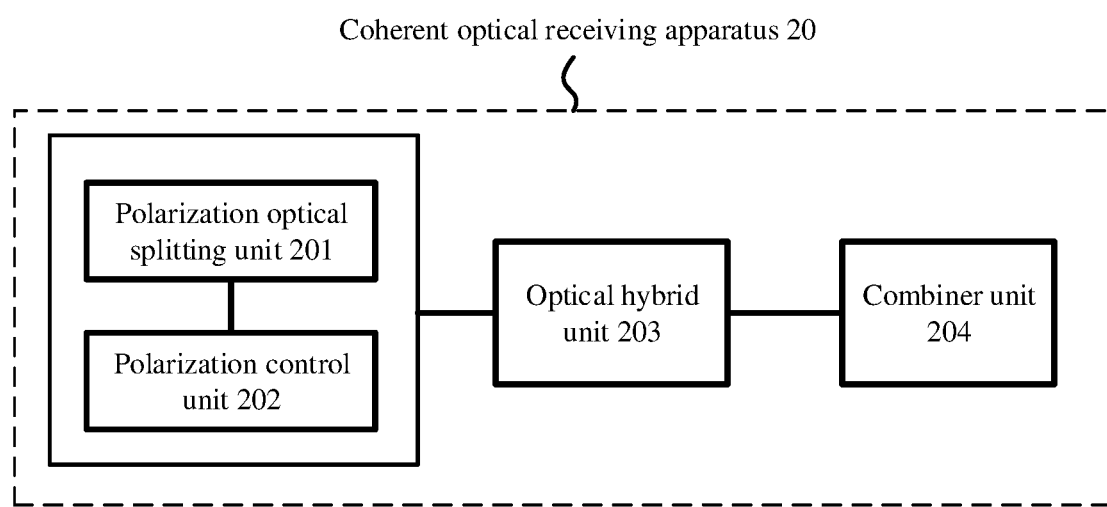
FIG. 2 is a schematic diagram of a first embodiment of a coherent optical receiving apparatus 20 according to an embodiment of this application.

FIG. 2 is a schematic diagram of a first embodiment of a coherent optical receiving apparatus 20 according to an embodiment of this application.

As shown in FIG. 2, the coherent optical receiving apparatus 20 in this embodiment of this application includes an optical splitting unit 201, a polarization control unit 202, an optical hybrid unit 203, and a combiner unit 204. First, local oscillator light in any polarization state and signal light in any polarization state are respectively input from a local oscillator optical port and a signal optical port of the coherent optical receiving apparatus 20. The optical splitting unit 201 decomposes the received local oscillator light to obtain a plurality of beams of sub local oscillator light, and the optical splitting unit 201 decomposes the received signal light to obtain a plurality of beams of sub signal light, where a quantity of the beams of sub local oscillator light is the same as a quantity of the beams of sub signal light. The optical hybrid unit 203 performs optical hybridization on each of the plurality of beams of sub signal light and one of the plurality of beams of sub local oscillator light, to obtain a plurality of beams of hybrid optical signals. The combiner unit 204 performs optical-to-electrical conversion on the plurality of beams of hybrid optical signals and outputs a plurality of coherent electrical signals. The polarization control unit 202 adjusts polarization of the local oscillator light, so that the DSP obtains service data based on the plurality of coherent electrical signals. Optionally, that the polarization control unit 202 adjusts polarization of the local oscillator light includes adjusting a phase of the local oscillator light.

In a possible design, polarization states of the plurality of beams of sub signal light obtained through decomposition by the optical splitting unit 201 and polarization states of the plurality of beams of sub local oscillator light obtained through decomposition by the optical splitting unit 201 are also random, and the sub signal light and the sub local oscillator light are not linearly polarized light.

In another possible design, the optical splitting unit 201 may be a polarization optical splitting unit. In this case, that the optical splitting unit 201 decomposes the received local oscillator light to obtain a plurality of beams of sub local oscillator light, and decomposes the received signal light to obtain a plurality of beams of sub signal light specifically includes decomposing the signal light into at least one beam of first sub signal light and at least one beam of second sub signal light, and decomposing the local oscillator light into at least one beam of first sub local oscillator light and at least one beam of second sub local oscillator light, where the first sub signal light and the first sub local oscillator light are in an X polarization state, and the second sub local oscillator light and the second sub signal light are in a Y polarization state.

That the optical hybrid unit 203 performs optical hybridization on each of the plurality of beams of sub signal light and one of the plurality of beams of sub local oscillator light, to obtain a plurality of beams of hybrid optical signals specifically includes the optical hybrid unit 203 performs optical hybridization on the first sub signal light and the first sub local oscillator light and performs optical hybridization on the second sub signal light and the second sub local oscillator light to obtain a plurality of beams of hybrid light. To be specific, optical hybridization is performed on each beam of the first sub signal light and one beam of the first sub local oscillator light, and optical hybridization is performed on each beam of the second sub signal light and one beam of the second sub local oscillator light.

Optionally, the combiner unit 204 may first combine every two beams of optical signals in the plurality of beams of hybrid optical signals output by the optical hybrid unit 203 after optical hybridization into one beam, to obtain a plurality of paths of beam-combined optical signals, where a quantity of the beam-combined optical signals is a half of a quantity of the hybrid optical signals. Then, optical-to-electrical conversion is performed on the plurality of paths of beam-combined optical signals to output the plurality of coherent electrical signals.

The polarization state of the local oscillator light randomly changes, and some polarization states make the coherent optical receiving apparatus fail to work. In the coherent optical receiving apparatus provided in this embodiment of this application, the polarization control unit is introduced to adjust the polarization of the local oscillator light, so that the local oscillator light avoids these polarization states that make the coherent optical receiving apparatus fail to work, thereby enabling the coherent optical receiving apparatus to maintain normal work.

Figure 3:
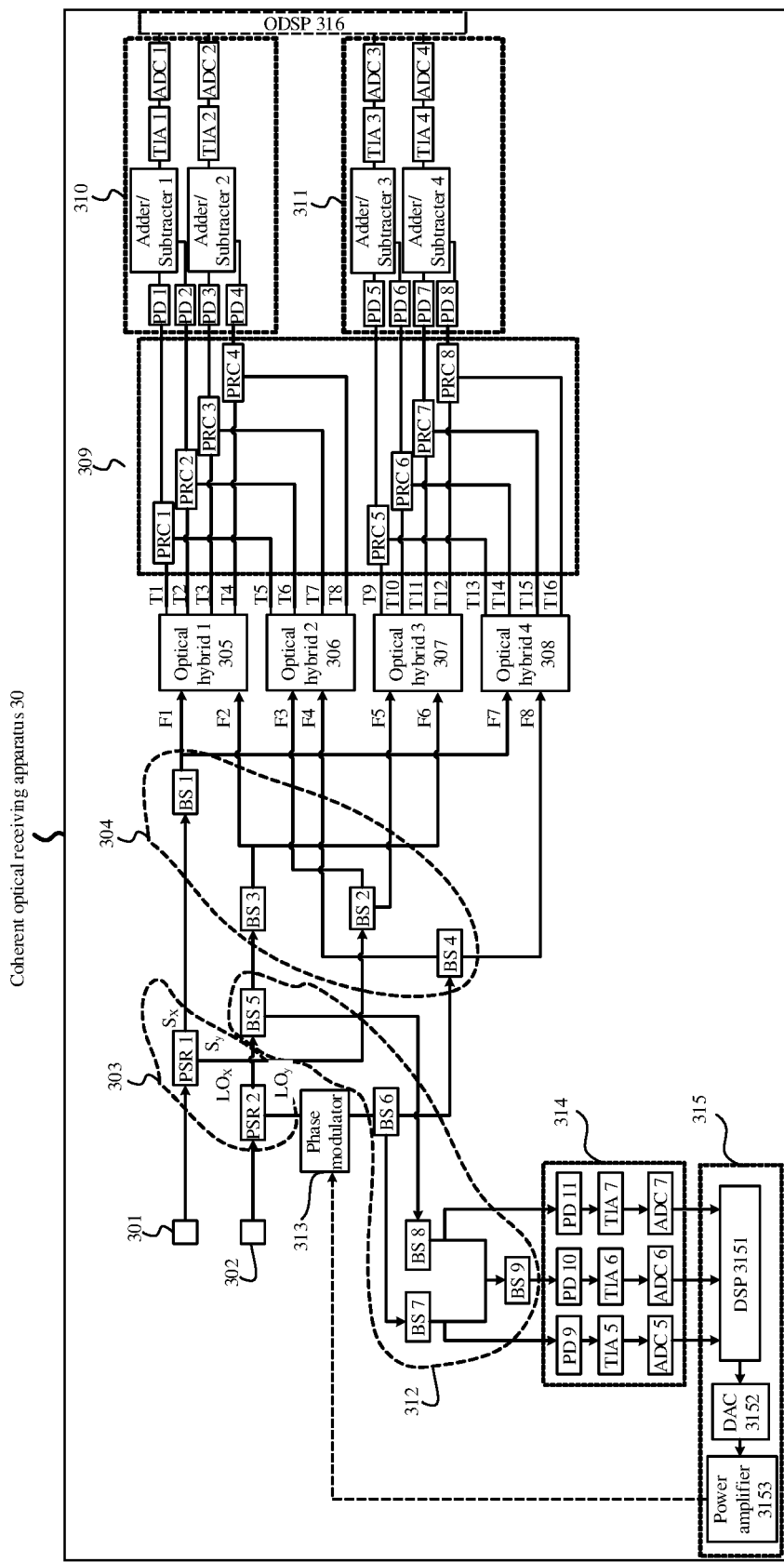
FIG. 3 is a schematic diagram of a second embodiment of a coherent optical receiving apparatus according to an embodiment of this application.

FIG. 3 is a schematic diagram of a second embodiment of a coherent optical receiving apparatus according to an embodiment of this application.

As shown in FIG. 3, the coherent optical receiving apparatus 30 in this embodiment of this application includes a signal optical input port 301, a local oscillator optical input port 302, a polarization beam splitting module 303, a power equalization module 304, an optical hybrid 1 305, an optical hybrid 2 306, an optical hybrid 3 307, an optical hybrid 4 308, a polarization beam combining module 309, a first optical-to-electrical conversion module 310, a second optical-to-electrical conversion module 311, a coupling beam splitting module 312, a phase modulator 313, a third optical-to-electrical conversion module 314, a signal processing module 315, and an optical digital signal processor (ODSP) 316. The phase modulator may be a general phase shifter (PS), or may be an element that can perform phase modulation, such as a half-wave plate or a lens.

Herein, for ease of description and understanding, the polarization beam splitting module, the power equalization module, and the polarization beam combining module described in this application that have similar functions in the apparatus are mainly put together. The optical-to-electrical conversion module, the coupling beam splitting module, and the signal processing module described in this application summarize functions of components in a specific range. The foregoing module division is used for ease of understanding of a solution, and different module division may actually exist.

The polarization optical splitting unit 201 in the embodiment in FIG. 2 includes the polarization beam splitting module 303 and the power equalization module 304 in this embodiment. The polarization control unit 202 includes the coupling beam splitting module 312, the phase modulator 313, the third optical-to-electrical conversion module 314, and the signal processing module 315. The optical hybrid unit 203 includes the optical hybrid 1 305, the optical hybrid 2 306, the optical hybrid 3 307, and the optical hybrid 4 308. The combiner unit 204 includes the polarization beam combining module 309, the first optical-to-electrical conversion module 310, and the second optical-to-electrical conversion module 311.

Signal light S is input from the signal optical input port 301, and a polarization splitter and rotator 1 (PSR) in the polarization beam splitting module 303 performs polarization beam splitting on the signal light S to obtain first signal light $S_X$ and second signal light $S_Y$, that is, light in an X polarization state of the signal light and light in a Y polarization state of the signal light. Then, a beam splitter 1 (BS) in the power equalization module 304 performs beam splitting on the first signal light $S_X$ to obtain two beams of first sub signal light: F1 and F7, where $F1=F7=S_X/2$, and a BS 2 performs beam splitting on the second signal light $S_Y$ to obtain two beams of second sub signal light: F3 and F4, where $F3=F5=S_Y/2$. Local oscillator (LO) light is input from the local oscillator optical input port 302, and a PSR 2 in the polarization beam splitting module 303 performs polarization beam splitting on the local oscillator light LO to obtain first local oscillator light $LO_X$ and second local oscillator light $LO_Y$, that is, light in the X polarization state of the local oscillator light and light in the Y polarization state of the local oscillator light. Then, a BS 3 in the power equalization module 304 performs beam splitting on the first local oscillator light $LO_X$ to obtain two beams of first sub local oscillator light: F2 and F6, where $F2=F6=LO_X/2$. A BS 4 performs beam splitting on the second local oscillator light $LO_Y$ to obtain two beams of second sub local oscillator light: F4 and F8, where $F4=F8=LO_Y/2$. Before entering the BS 3 and the BS 4, a small part of the first local oscillator light $LO_X$ and a small part of the second local oscillator light $LO_Y$ are respectively obtained by a BS 5 and a BS 6 through division for polarization control.

The optical hybrid 1 305 receives F1 and F2 and performs optical hybridization to obtain four paths of hybrid light: T1, T2, T3, and T4. The optical hybrid 2 306 receives F3 and F4 and performs optical hybridization to obtain four paths of hybrid light: T5, T6, T7, and T8. The optical hybrid 3 307 receives F5 and F6 and performs optical hybridization to obtain four paths of hybrid light: T9, T10, T11, and T12. The optical hybrid 4 308 receives F7 and F8 and performs optical hybridization to obtain four paths of hybrid light: T13, T14, T15, and T16. 16 beams of hybrid light are obtained herein.

Figure 4:
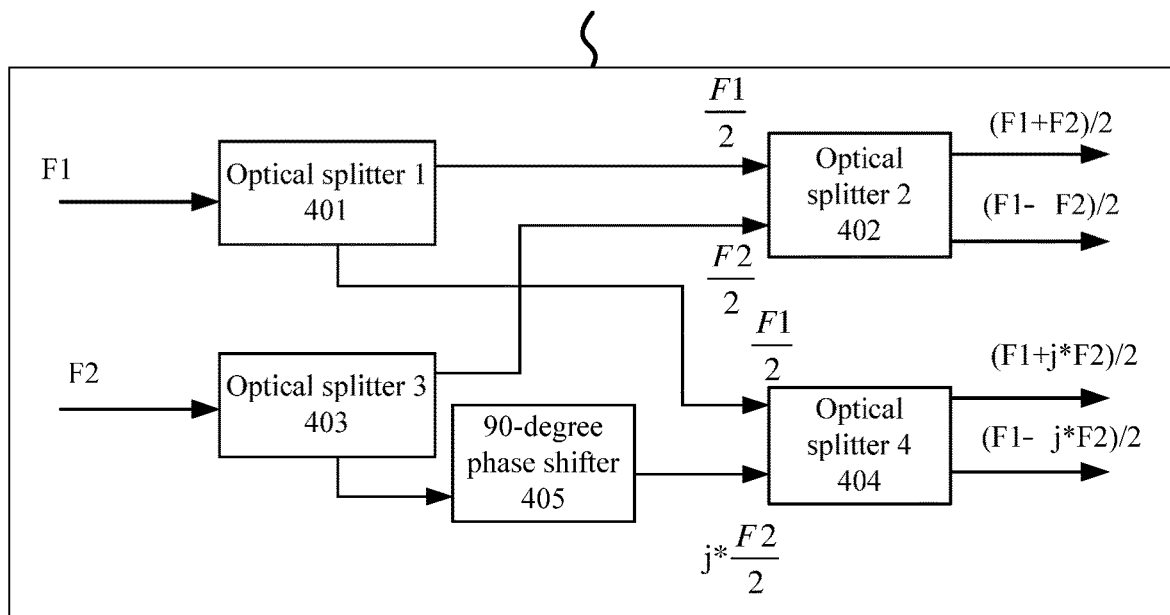
FIG. 4 is a schematic diagram of a structure of an optical hybrid according to an embodiment of this application.

FIG. 4 is a schematic diagram of a structure of an optical hybrid according to an embodiment of this application. Using the optical hybrid 1 305 as an example, the optical hybrid includes an optical splitter 1 401, an optical splitter 2 402, an optical splitter 3 403, an optical splitter 4 404, and a 90-degree phase shifter 405. The optical splitter 1 401 receives the light beam F1 and performs beam splitting on F1 to obtain two beams of $$\frac{F1}{2}.$$

The optical splitter 3 403 receives the light beam F3 and performs beam splitting on F3 to obtain two beams of $$\frac{F2}{2}.$$

The 90-degree phase shifter 405 phase-shifts one beam of $$\frac{F2}{2}$$

by 90 degrees to obtain $$j*\frac{F2}{2}.$$

As shown in FIG. 4, the optical splitter 2 402 receives the light beams $$\frac{F1}{2} \text{ and } \frac{F2}{2},$$

and performs coupling beam splitting to obtain (F1+F2)/2 and (F1−F2)/2. The optical splitter 3 403 receives $$\frac{F1}{2} \text{ and } j*\frac{F2}{2}$$

and performs coupling beam splitting to obtain hybrid light (F1+j*F2)/2 (F1−j*F2)/2. After F1=$S_x$/2 and F2=$LO_x$/2 are substituted into (F1+j*F2)/2 and (F1−j*F2)/2, T1=¼($S_x$+$LO_x$); T2=¼($S_x$−$LO_x$) can be obtained.

Structural principles of the optical hybrid 2 306, the optical hybrid 3 307, and the optical hybrid 4 308 are similar to that of the optical hybrid 1 305. The foregoing 16 beams of hybrid light may be specifically as follows:

$T_1$=¼($S_x$+$LO_x$);$T_2$=¼($S_x$−$LO_x$);$T_3$=¼($S_x$+$jLO_x$);
$T_4$=¼($S_x$−$jLO_x$);

$T_5$=¼($S_y$+$LO_y$);$T_6$=¼($S_y$−$LO_y$);$T_7$=¼($S_y$+$jLO_y$);$T_8$=¼($S_y$−$jLO_y$);

$T_9$=¼($S_y$+$LO_x$);$T_{10}$=¼($S_y$−$LO_x$);$T_{11}$=¼($S_y$+$jLO_x$);
$T_{12}$=¼($S_y$−$jLO_x$);

$T_{13}$=¼($S_x$+$LO_y$);$T_{14}$=¼($S_x$−$LO_y$);$T_{15}$=¼($S_x$+$jLO_y$);
$T_{16}$=¼($S_x$−$jLO_y$)

In view of this, the optical hybrid unit in the solution provided in this embodiment of this application has four optical hybrids. When optical hybridization is performed on the signal light and the local oscillator light, the following four cases are all included: Optical hybridization is performed on the X polarization state of the signal light and the X polarization state of the local oscillator light, optical hybridization is performed on the X polarization state of the signal light and the Y polarization state of the local oscillator light, optical hybridization is performed on the Y polarization state of the signal light and the X polarization state of the local oscillator light, and optical hybridization is performed on the Y polarization state of the signal light and the Y polarization state of the local oscillator light. The existing coherent optical receiving apparatus usually includes only two of the foregoing four cases. As shown in FIG. 1b, the following two cases usually exist: Optical hybridization is performed on the X polarization state of the signal light and the Y polarization state of the local oscillator light and optical hybridization is performed on the Y polarization state of the signal light and the X polarization state of the local oscillator light. When the polarization states of the signal light and the local oscillator light are both random, energy of the optical signal is very likely to be concentrated in one polarization state and there is almost no energy in the other polarization state. The foregoing example is still used. Assuming that energy of the local oscillator light is concentrated in the X polarization state, and there is almost no energy in the Y polarization state of the local oscillator light, in the existing coherent optical receiving apparatus, normal optical hybridization cannot be performed on the X polarization state of the signal light and the Y polarization state of the local oscillator light. Then, the service data carried in the X polarization state of the signal light is missing. In the solution of this embodiment of this application, optical hybridization can still be normally performed on the X polarization state of the signal light and the X polarization state of the local oscillator light. Therefore, this embodiment of this application effectively avoids a problem that a receiver cannot normally work due to a random change of a polarization state of local oscillator light.

Polarization beam combination may be first performed on the foregoing 16 beams of hybrid light, and then optical-to-electrical conversion is performed to obtain a plurality of coherent electrical signals. Specifically, the polarization beam combining module 309 includes eight polarization rotator and combiners (PRCs), and each PRC performs beam combination on two of the 16 beams of hybrid light. For example, as shown in FIG. 3, a PRC 1 performs beam combination on the hybrid light T1 and T5, a PRC 2 performs beam combination on the hybrid light T2 and T6, a PRC 3 performs beam combination on the hybrid light T3 and T7, a PRC 4 performs beam combination on the hybrid light T4 and T8, and so on. An $x^{th}$ output light beam in the optical hybrid 1 305 is combined with an $(x+a)^{th}$ output light beam in the optical hybrid 2 306 into one path, and an $x^{th}$ output light beam in the optical hybrid 3 307 is combined with an $(x+a)^{th}$ output light beam in the optical hybrid 4 308 into one path, where a represents a quantity of light beams output by the PRC. Using the PRC 1 as an example, the PRC 1 performs beam combination on T1 and T5. A loss usually occurs in a beam combination process. Herein, calculation is performed by assuming that both T1 and T5 are lost by a half, and the light beam after combination is $$E1 = \begin{pmatrix} T_1 \\ T_5 \end{pmatrix} = \begin{pmatrix} \frac{1}{8}(S_x + LO_x) \\ \frac{1}{8}(S_y + LO_y) \end{pmatrix}$$

Likewise, the following may be obtained:

$$E2 = \begin{pmatrix} T_2 \\ T_6 \end{pmatrix} = \begin{pmatrix} \frac{1}{8}(S_x - LO_x) \\ \frac{1}{8}(S_y - LO_y) \end{pmatrix}$$

Light beams E1 and E2 are respectively received by a photonic detector 1 (PD) and a PD 2 in the first optical-to-electrical conversion module 310 to obtain electrical domain signals:

$$Q1 = \frac{1}{32}(|S_x + LO_x|^2 + |S_y + LO_y|^2)$$

-continued
$$Q2 = \frac{1}{32}(|S_x - LO_x|^2 + |S_y - LO_y|^2)$$

After addition and subtraction: Q1<-Q2 is performed by an adder/subtracter 1 of the first optical-to-electrical conversion module 310, a coherent electrical signal $I_{1,I}$ output by the adder/subtracter 1 is $$I_{1,I} = \frac{1}{16} \text{ real } \{S_x LO_x^* + S_y LO_y^*\}$$

Similarly, it can be learned that, a coherent electrical signal $I_{1,Q}$ output by an adder/subtracter 2 is:

$$I_{1,Q} = \frac{1}{16} \text{ imag } \{S_x LO_x^* + S_y LO_y^*\}$$

$$I_{1,I} = \frac{1}{16} \text{ real } \{S_x LO_x^* + S_y LO_y^*\}$$

A coherent electrical signal $I_{2,I}$ output by an adder/subtracter 3 is:

$$I_{2,I} = \frac{1}{16} \text{ real } \{S_x LO_y^* + S_y LO_x^*\}$$

A coherent electrical signal $I_{2,Q}$ output by an adder/subtracter 4 is:

$$I_{2,Q} = \frac{1}{16} \text{ imag } \{S_x LO_y^* + S_y LO_x^*\}$$

An operation real represents taking a real part, and an operation imag represents taking an imaginary part.

The four paths of coherent electrical signals: $I_{1,I}$, $I_{1,Q}$, $I_{2,I}$, $I_{2,Q}$ are amplified by respective trans-impedance amplifiers (TIA) and then sampled by an analog-to-digital converter (ADC), and then sent to an ODSP 316 for processing to restore service data. Optionally, the coherent optical receiving apparatus 30 may include an ODSP 316, and the ODSP 316 may be alternatively located outside the coherent optical receiving apparatus 30.

The ODSP 316 then performs restoration based on the coherent electrical signals to obtain the service data. The ODSP 316 may fail to perform restoration based on the coherent electrical signals to obtain the service data when a polarization rotation angle or a polarization delay angle of the local oscillator light has a specific value.

Specifically, in the ODSP 316, two paths of complex signals: $I_1$ and $I_2$ may be deduced to obtain the following relationship:

$$\binom{I_1}{I_2} = \binom{I_{1,I} + I_{1,Q}j}{I_{2,I} + I_{2,Q}j} = \frac{1}{8}\binom{S_x LO_x^* + S_y LO_y^*}{S_x LO_y^* + S_y LO_x^*} = \frac{1}{8}\begin{pmatrix} LO_x^* & LO_y^* \\ LO_y^* & LO_x^* \end{pmatrix}\binom{S_x}{S_y}$$

If a matrix $$M = \begin{pmatrix} LO_x^* & LO_y^* \\ LO_y^* & LO_x^* \end{pmatrix}$$

is reversible, a MIMO algorithm in the ODSP 316 may perform restoration in the two paths of complex signals $$\binom{I_1}{I_2}$$

to obtain the service data.

The local oscillator light is linearly polarized light at a transmit end, and may be denoted as $$\binom{E_{LO}}{0}.$$

The local oscillator light that reaches a receive end after being transmitted on an optical fiber channel (passing through a Jones matrix) may be denoted as $$\binom{LO_x}{LO_y} = \binom{E_{LO} \cos\theta}{E_{LO} \sin\theta e^{-j\varphi}},$$

where θ represents the polarization rotation angle of the local oscillator light, and φ represents the polarization delay angle of the local oscillator light. After the formula is substituted into the M matrix, the following may be obtained:

$$M = \begin{pmatrix} \cos\theta & \sin\theta e^{j\varphi} \\ \sin\theta e^{j\varphi} & \cos\theta \end{pmatrix} E_{LO}^* \quad (1)$$

It can be found according to the foregoing formula (1) that, when cos θ=sin θ, $e^{j\varphi}$=0, the M matrix is irreversible, and the ODSP 316 cannot perform restoration based on the coherent electrical signals to obtain the service data.

In this embodiment of this application, the polarization control unit is introduced to adjust polarization of the local oscillator light, so that the ODSP 316 obtains the service data based on the plurality of coherent electrical signals. Specifically, the phase modulator 313 is added to one of the first local oscillator light $LO_X$ and the second local oscillator light $LO_Y$ of the local oscillator light that pass through the PSR 2. In FIG. 3, the phase modulator 313 is placed on a branch of the second local oscillator light $LO_Y$. Optionally, the phase modulator 313 may be alternatively placed on a branch of the first local oscillator light $LO_X$. The polarization delay angle φ of the first local oscillator light or the second local oscillator light is adjusted by controlling the phase modulator, so that the M matrix can be controlled to be always in a reversible state.

Assuming that the phase modulator 313 introduces a change of a phase ∅ to the polarization delay angle φ of the first local oscillator light or the second local oscillator light, the M matrix may be rewritten as:

$$M = \begin{pmatrix} \cos\theta & \sin\theta e^{j(\varphi-\emptyset)} \\ \sin\theta e^{j\varphi} & \cos\theta \end{pmatrix} E_{LO}^* \quad (2)$$

Figure 5:
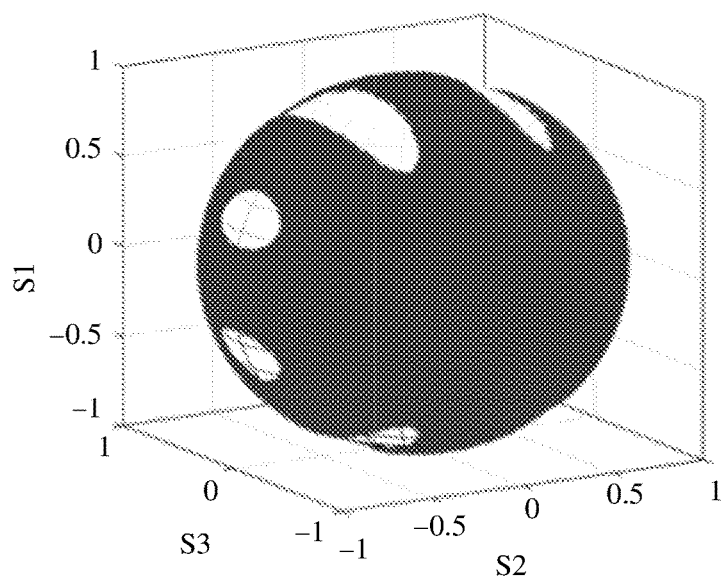
FIG. 5 is a schematic diagram of a Poincare sphere corresponding to local oscillator light.

FIG. 5 is a schematic diagram of a Poincare sphere corresponding to local oscillator light. As shown in FIG. 5, after the polarization rotation angle θ of the local oscillator light and the polarization delay angle φ of the local oscillator light traverse values, polarization states of the local oscillator light all fall onto a spherical surface of the Poincare sphere. The local oscillator light obtained after adjustment is performed by introducing the phase ∅ by the phase modulator 313 to the polarization delay angle φ of the first local oscillator light or the second local oscillator light falls into a black range on the spherical surface, and the M matrix reaches the reversible state. Therefore, the polarization control unit 202 only needs to enable the local oscillator light that performs random disturbance on the spherical surface to bypass a white range and fall into the black range, so that the ODSP 316 can perform restoration based on the coherent electrical signals to obtain the service data, and the coherent optical receiving apparatus normally works, to greatly reduce difficulty of feedback control. In the existing coherent optical receiving apparatus, the local oscillator light that performs random disturbance on the spherical surface usually needs to be controlled to be at one dot or in a small region of the spherical surface, and the control difficulty is high. The difficulty and precision of polarization control provided in this embodiment of this application are reduced, so that design costs are reduced.

Figure 6:
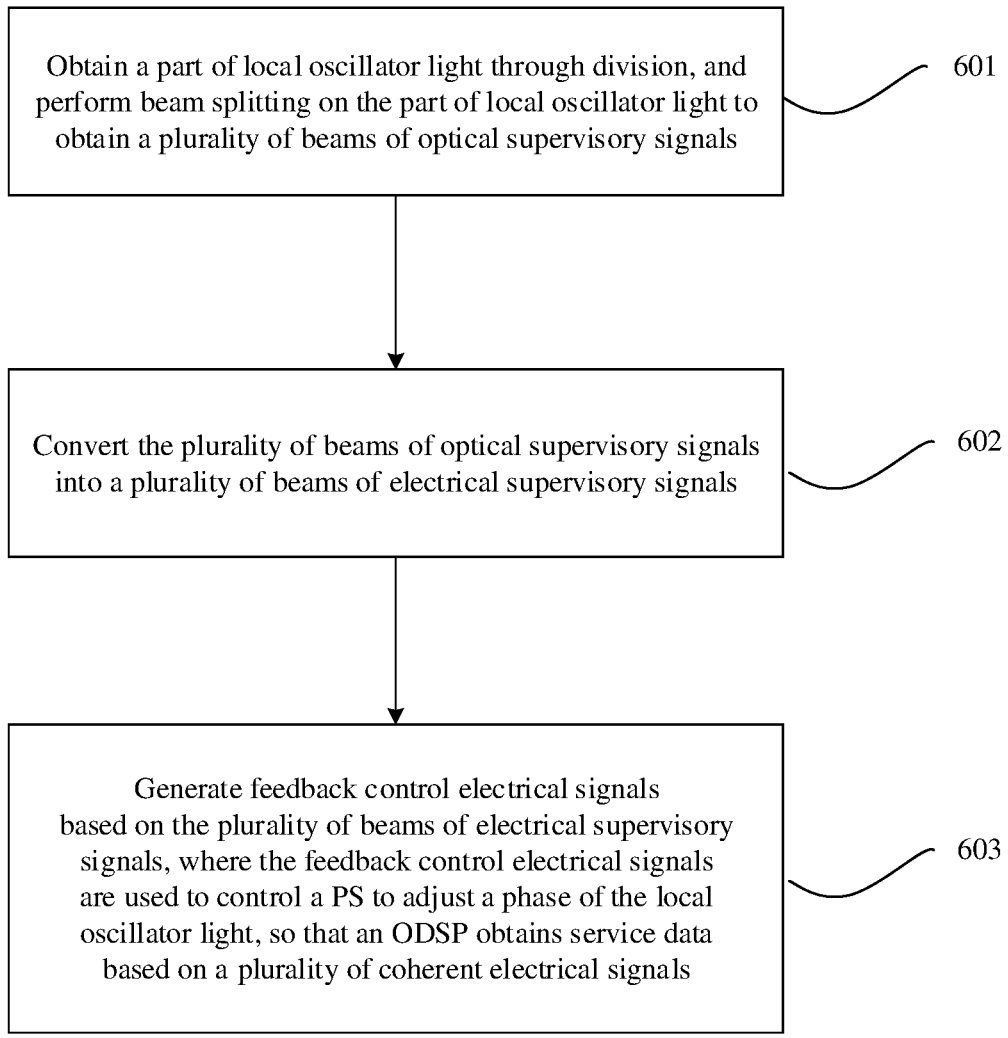
FIG. 6 is a flowchart of a polarization control method according to an embodiment of this application.

FIG. 6 is a flowchart of a polarization control method according to an embodiment of this application. Specifically, a control process of a polarization control unit 202 is as follows.

Step 601: Obtain a part of local oscillator light through division, and perform beam splitting on the part of local oscillator light to obtain a plurality of beams of optical supervisory signals.

A coupling beam splitting module 312 includes a plurality of BSs. A BS 5 and a BS 6 separately obtain a small part of local oscillator light through coupling. The two beams of light are then respectively equally divided by a BS 7 and a BS 8 into four paths of optical supervisory signals. Two paths of the optical supervisory signals are then coupled and added by a BS 9 to obtain the following three paths of hybrid light:

$$\begin{bmatrix} A_1 \\ A_2 \\ A_3 \end{bmatrix} \sim \left[ \cos\theta + j\sin\begin{matrix} \cos\theta \\ \theta \\ \sin\theta e^{-j(\varphi+\emptyset)} \end{matrix} e^{-j(\varphi+\emptyset)} \right] E_{LO}$$

Step 602: Convert the plurality of beams of optical supervisory signals into a plurality of beams of electrical supervisory signals.

The foregoing three paths of hybrid light are then received by a PD 9, a PD 10, and a PD 11 in a third optical-to-electrical conversion module 314, amplified by a TIA 5, a TIA 6, and a TIA 7 in the third optical-to-electrical conversion module 314, and sampled by an ADC 5, an ADC 6, and an ADC 7 in the third optical-to-electrical conversion module 314, to obtain three paths of electrical supervisory signals:

$$\begin{bmatrix} I_{10} \\ I_{20} \\ I_{30} \end{bmatrix} \sim \begin{bmatrix} \cos^2\theta \\ 1 + \sin\theta\cos\theta\sin(\varphi+\emptyset) \\ \sin^2\theta \end{bmatrix} |E_{LO}|^2$$

Step 603: Generate feedback control electrical signals based on the plurality of beams of electrical supervisory signals, where the feedback control electrical signals are used to control a phase modulator to adjust polarization of the local oscillator light, so that an ODSP 316 obtains service data based on the plurality of coherent electrical signals.

Specifically, a signal processing module 315 monitors energy of the electrical supervisory signals.

When a difference between $I_{10}$ and $I_{30}$ is within a preset range, it indicates that a polarization rotation angle θ is near 0 or 90 degrees, an M matrix is quite healthy, and a phase modulator 313 does not need to work.

When energy of $I_{10}$ is close to that of $I_{30}$, the phase modulator 313 needs to be started to control polarization of the local oscillator light. In this case, the signal processing module 315 generates the feedback control signals to adjust the phase modulator 313. When the phase modulator 313 makes energy of $(I_2-I_1-I_3)$ increase through adjustment, it can be determined that the current M matrix is reversible, and the coherent optical receiving apparatus can normally work. Optionally, the feedback control electrical signals control the phase modulator 313 to adjust a phase of the foregoing first local oscillator light or second local oscillator light, so that an ODSP 316 obtains service data based on the foregoing plurality of coherent electrical signals. Further, adjusting the phase of the foregoing first local oscillator light or second local oscillator light includes adjusting a polarization delay angle of the foregoing first local oscillator light or second local oscillator light. For example, the phase modulator 313 introduces a phase ∅ to the first local oscillator light or the second local oscillator light, and when (φ+∅) approaches 90 degrees, that is, the polarization delay angle φ of the first local oscillator light or the second local oscillator light plus the phase ∅ introduced by the phase modulator 313 approaches 90 degrees, it is considered that the coherent optical receiving apparatus can normally work in this case.

Specifically, the signal processing module 315 includes a DSP 3151, a digital-to-analog converter 3152 (DAC), and a power amplifier 3153. The DSP 3151 is configured to generate the feedback control electrical signals based on the electrical supervisory signals, where the feedback control electrical signals are used to control the phase modulator to adjust polarization of the local oscillator light, so that the ODSP 316 obtains the service data based on the plurality of coherent electrical signals. The DAC 3152 is configured to perform digital-to-analog conversion on the feedback control electrical signals. The power amplifier 3153 is configured to perform power amplification on the feedback control electrical signals on which digital-to-analog conversion is performed.

Optionally, 90:10 or 95:5 optical splitters may be selected as the BS 5 and the BS 6. To be specific, 10% or 5% of local oscillator light of respective branches is obtained through coupling, for polarization control.

In summary, the coherent optical receiving apparatus disclosed in this embodiment of this application resolves the difficult problem that the receiver cannot normally work due to the random change of the polarization state of the local oscillator light. Introducing polarization control enables the coherent optical receiving apparatus to maintain normal restoration of the service data, to further improve coherent optical receiving stability, simplify the polarization control unit, and reduce difficulty and precision of polarization control, thereby reducing costs.

90-degree phase shift or 90-degree polarization state rotation mentioned in this application may be alternatively 270-degree phase shift or 270-degree polarization state rotation, provided that the phase shift or polarization state rotation achieves a same technical effect as the 90-degree phase shift or 90-degree polarization state rotation. It should be noted that, the above-mentioned degrees of rotation may slightly deviate due to a reason such as limitation on an actual device process. It should be understood that, the 90-degree phase shift or 90-degree polarization state rotation mentioned in this application includes this approximate-90-degree or approximate-270-degree rotation.

It should be noted that, the PSR mentioned in embodiments of this application may be replaced with a connected combination of a polarization beam splitter (PBS) and a polarization rotator (PR), and the PRC may be replaced with a connected combination of a polarization beam combiner (PBC) and a PR. It should be understood that, replacing the PSR with the connected combination of the PBS and the PR and replacing the PRC with the combination of the PBC and the PR are simple structural variants, and are also technical solutions to be protected in this application. The optical splitter may be a waveguide coupler or a multimode interferometer (MMI) coupler.

For ease of description and understanding, same modules or components in embodiments of this application use same reference numerals.

Figure 7:
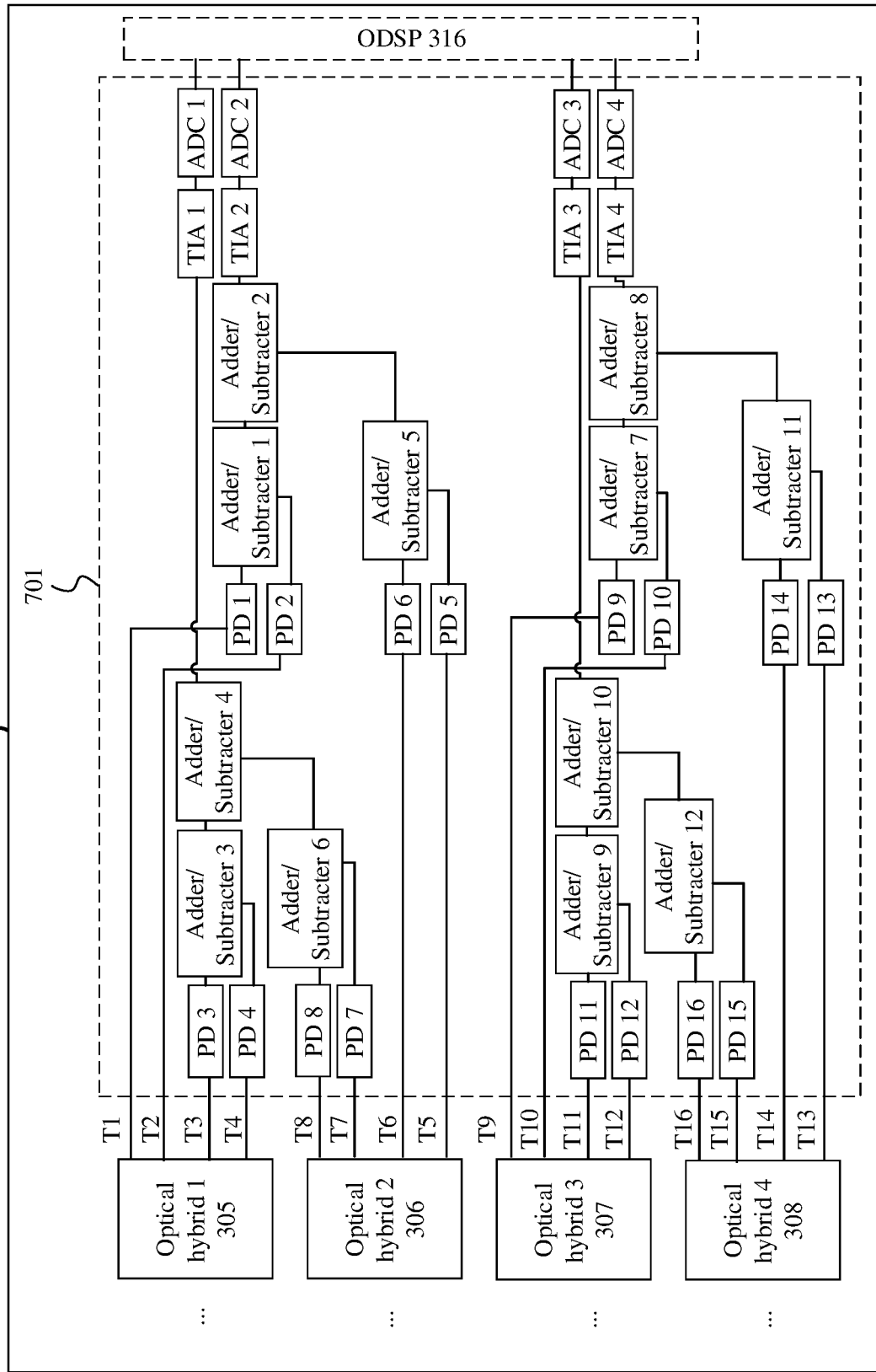
FIG. 7 is a schematic diagram of a third embodiment of a coherent optical receiving apparatus according to an embodiment of this application.

FIG. 7 is a schematic diagram of a third embodiment of a coherent optical receiving apparatus according to an embodiment of this application.

As shown in FIG. 7, the coherent optical receiving apparatus 70 includes a signal optical input port 301, a local oscillator optical input port 302, a polarization beam splitting module 303, a power equalization module 304, an optical hybrid 1 305, an optical hybrid 2 306, an optical hybrid 3 307, an optical hybrid 4 308, an optical-to-electrical conversion module 701, a coupling beam splitting module 312, a phase modulator 313, a third optical-to-electrical conversion module 314, a signal processing module 315, and an ODSP 316. To simplify the drawing representation, the signal optical input port 301, the local oscillator optical input port 302, the polarization beam splitting module 303, the power equalization module 304, the coupling beam splitting module 312, the phase modulator 313, the third optical-to-electrical conversion module 314, and the signal processing module 315 are the same as those shown in FIG. 3 and are not shown in FIG. 7. The difference between FIG. 7 and FIG. 3 mainly lies in the optical-to-electrical conversion module 701 that processes 16 beams of hybrid light output by the optical hybrid unit. For a structure between the optical hybrid 1 305, the optical hybrid 2 306, the optical hybrid 3 307, and the optical hybrid 4 308, refer to FIG. 3.

The 16 beams of hybrid light T1 to T16 output by the optical hybrid 1 305, the optical hybrid 2 306, the optical hybrid 3 307, and the optical hybrid 4 308 are respectively converted by a PD 1 to a PD 16 into electrical signals first, and then added and subtracted by adders/subtracters to obtain a plurality of coherent electrical signals.

For example, four paths of hybrid electrical signals are obtained after T1, T2, T5, and T6 are detected by PDs:

$$Q_1 = \frac{1}{16}|S_x + LO_x|^2, \quad Q_2 = \frac{1}{16}|S_x - LO_x|^2,$$

$$Q_5 = \frac{1}{16}|S_y - LO_y|^2, \quad Q_6 = \frac{1}{16}|S_y - LO_y|^2$$

After Q1 and Q2 are added and subtracted by an adder/subtracter 1, the following is obtained:

$$Q_1 - Q_2 = \tfrac{1}{4}\mathrm{real}\{S_x LO^*_x\}$$

After Q5 and Q6 are added and subtracted by an adder/subtracter 5, the following is obtained:

$$Q_5 - Q_6 = \tfrac{1}{4}\mathrm{real}\{S_y LO^*_y\}$$

The foregoing two paths of electrical signals: Q1-Q2 and Q5-Q6 then pass through an adder/subtracter 2 to obtain a coherent electrical signal $I_{1,I}$.

$$I_{1,I} = \tfrac{1}{4}\mathrm{real}\{S_x LO^*_x + S_y LO^*_y\}$$

Similarly, it can be learned that, a coherent electrical signal $I_{1,Q}$ output by an adder/subtracter 4 is:

$$I_{1,Q} = \tfrac{1}{4}\mathrm{imag}\{S_x LO^*_x + S_y LO^*_y\}$$

A coherent electrical signal $I_{2,I}$ output by an adder/subtracter 8 is:

$$I_{2,I} = \tfrac{1}{4}\mathrm{real}\{S_x LO^*_y + S_y LO^*_x\}$$

A coherent electrical signal $I_{2,Q}$ output by an adder/subtracter 10 is:

$$I_{2,Q} = \tfrac{1}{4}\mathrm{imag}\{S_x LO^*_y + S_y LO^*_x\}$$

To facilitate wiring of the signals added on the electrical domain, as shown in FIG. 7, a sequence of outputting the hybrid light by the optical hybrid 2 306 and the optical hybrid 4 308 may be switched to alleviate subsequent optical path crossing of the optical hybrids.

The coherent optical receiving apparatus provided in this embodiment of this application does not use an optical path polarization beam combining solution for the hybrid light output by the optical hybrids, but directly performs addition and subtraction by adding adders/subtracters, to avoid a coupling loss caused by polarization beam combining, and reduce an insertion loss.

Figure 8:
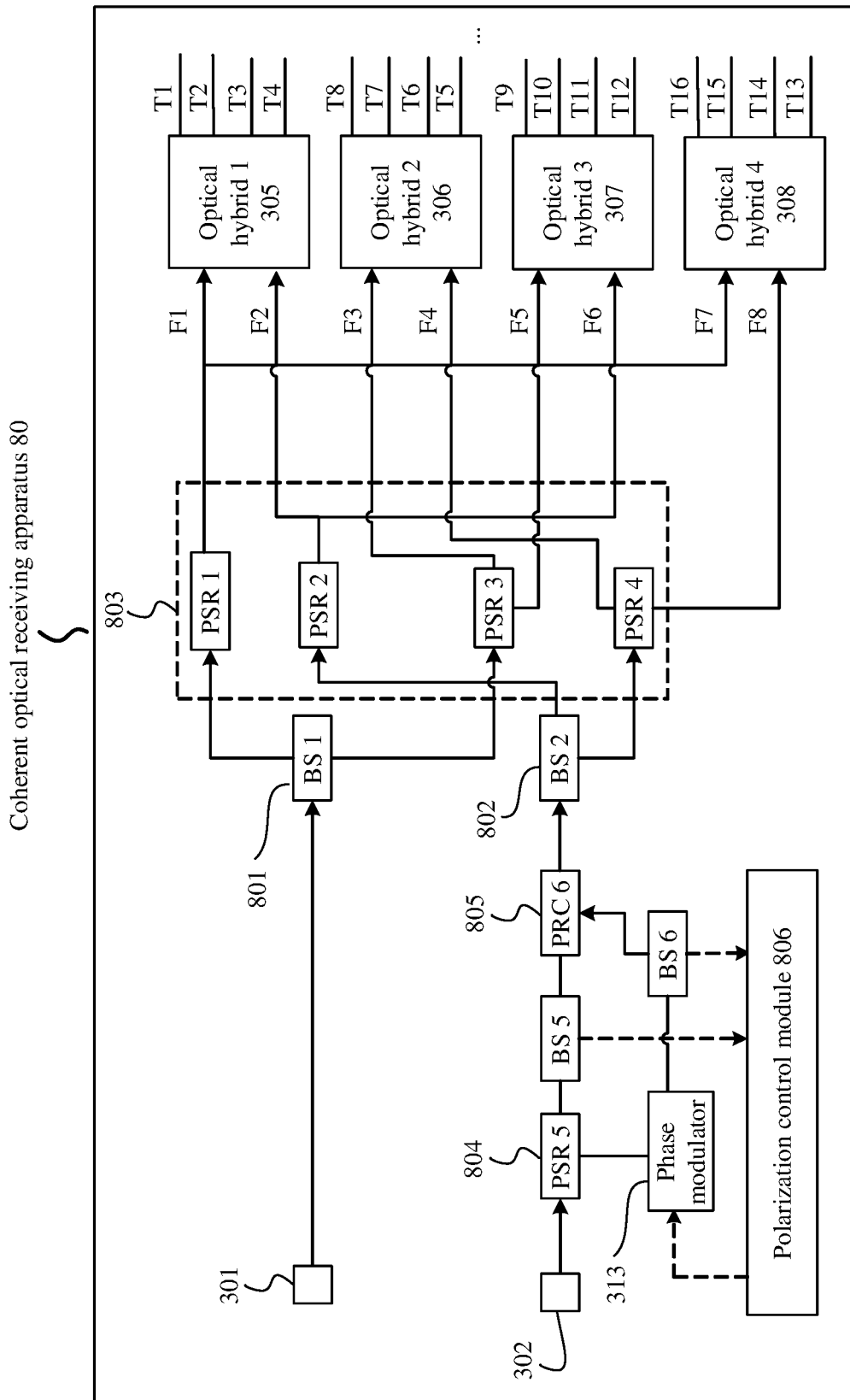
FIG. 8 is a schematic diagram of a fourth embodiment of a coherent optical receiving apparatus according to an embodiment of this application.

FIG. 8 is a schematic diagram of a fourth embodiment of a coherent optical receiving apparatus according to an embodiment of this application.

As shown in FIG. 8, the coherent optical receiving apparatus 80 includes a BS 1 801, a BS 2 802, a polarization beam splitting module 803, a PSR 4 804, a PSR 6 805, and a polarization control module 806, and further includes a signal optical input port 301, a local oscillator optical input port 302, an optical hybrid 1 305, an optical hybrid 2 306, an optical hybrid 3 307, an optical hybrid 4 308, a phase modulator 313, and an ODSP 316. Refer to FIG. 3 for related descriptions. The polarization beam splitting module 803 includes four PSRs: a PSR 1, a PSR 2, a PSR 3, and a PSR 4. The embodiment shown in FIG. 8 mainly differs from the embodiment shown in FIG. 3 in that, optical path simplification is performed for polarization beam splitting of signal light and local oscillator light.

The signal light S is input from the signal optical input port 301, and after power beam splitting is performed on the signal light S by using the BS 1 801, first signal light and second signal light are obtained.

The PSR 1 in the polarization beam splitting module 803 performs polarization beam splitting on the first signal light to obtain one beam of first sub signal light F1 and one beam of second sub signal light F7. The PSR 3 performs polarization beam splitting on the second signal light to obtain another beam of first sub signal light F3 and another beam of second sub signal light F5. The first sub signal light is in an X polarization state, and the second sub signal light is in a Y polarization state.

The local oscillator light LO is input from the local oscillator optical input port 302, and third local oscillator light and fourth local oscillator light are first obtained by performing polarization beam splitting by using the PSR 5 804, where the third local oscillator light is in the X polarization state, and the fourth local oscillator light is in the Y polarization state. The BS 5 and the BS 6 separately obtain a part of the local oscillator light through coupling and input the part of the local oscillator light to the polarization control module 806 for polarization control. Optical supervisory signals are obtained based on the part of the local oscillator light. The optical supervisory signals are converted into electrical supervisory signals. Feedback control signals are generated based on the electrical supervisory signals to control the phase modulator 313 to adjust a phase of the fourth local oscillator light. For a specific principle of the polarization control module 806, refer to related descriptions of FIG. 3. The PRC 6 805 performs polarization beam combination on the third local oscillator light and the fourth local oscillator light that pass through the BS 5 and the BS 6, for input to the BS 2 802.

The polarization control module 806 may include the BS 7, the BS 8, and the BS 9 in the coupling beam splitting module 312, the third optical-to-electrical conversion module 314, the signal processing module 315, and the ODSP 316 in the embodiment of FIG. 3.

The BS 2 802 performs power beam splitting on the local oscillator light to obtain first local oscillator light and second local oscillator light. The PSR 2 in the polarization beam splitting module 803 performs polarization beam splitting on the first local oscillator light to obtain one beam of first sub local oscillator light F2 and one beam of second sub local oscillator light F6. The PSR 4 performs polarization beam splitting on the second local oscillator light to obtain another beam of first sub local oscillator light F4 and another beam of second sub local oscillator light F8. The first sub local oscillator light is in the X polarization state, and the second sub local oscillator light is in the Y polarization state.

The optical-to-electrical conversion module 701 in FIG. 7 may be further connected following the optical hybrids in FIG. 8, or the polarization beam combining module 309 in FIG. 3 may be connected, and then the first optical-to-electrical conversion module 310 and the second optical-to-electrical conversion module 311 are connected.

The polarization optical splitting solution in FIG. 3 in this application is first performing polarization beam splitting by using the PSRs and then performing power beam splitting by using the BSs, but the polarization optical splitting solution in FIG. 8 of this application is first performing power beam splitting by using the BSs, and then performing polarization beam splitting by using the PSRs. In an actual optical path, polarization optical splitting for the signal light and the local oscillator light may be alternatively as follows. The polarization optical splitting solution in the embodiment of FIG. 3 is used for the signal light, and the polarization optical splitting solution in the embodiment of FIG. 8 is used for the local oscillator light, or the polarization optical splitting solution in the embodiment of FIG. 8 may be used for the signal light, and the polarization optical splitting solution in the embodiment of FIG. 3 is used for the local oscillator light. This embodiment of this application shows only possible combination solutions. It is recommended that on the basis of this embodiment of this application, combinations easily thought out of the structures of this embodiment of this application should also fall within the protection scope of this application.

Figure 9:
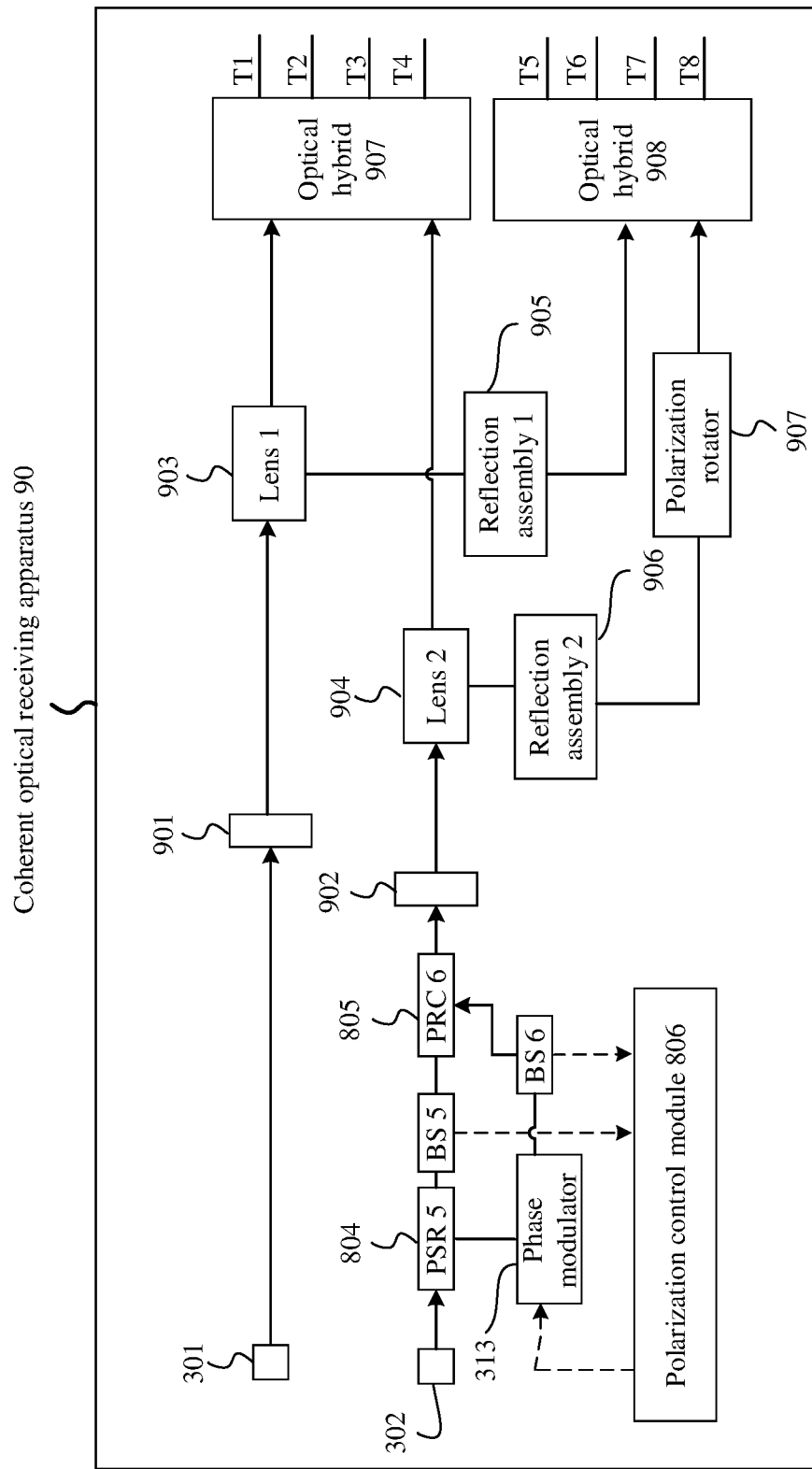
FIG. 9 is a schematic diagram of a fifth embodiment of a coherent optical receiving apparatus according to an embodiment of this application.

FIG. 9 is a schematic diagram of a fifth embodiment of a coherent optical receiving apparatus according to an embodiment of this application.

As shown in FIG. 9, the coherent optical receiving apparatus 90 includes an optical fiber collimator 901, an optical fiber collimator 902, a lens 1 903, a lens 2 904, a reflection assembly 1 905, a reflection assembly 2 906, a polarization rotator 907, an optical hybrid 908, and an optical hybrid 909, and further includes a signal optical input port 301, a local oscillator optical input port 302, a phase modulator 313, and a polarization control module 806. Refer to FIG. 3 and FIG. 8 for related descriptions.

After being collimated by the optical fiber collimator 901, signal light is input to the lens 1 903, and the lens 1 903 decomposes the signal light into first signal light and second signal light. After being collimated by the optical fiber collimator 902, local oscillator light is input to the lens 2 904, and the lens 2 904 decomposes the local oscillator light into first local oscillator light and second local oscillator light. After polarization rotation is performed on the second local oscillator light by the polarization rotator 907, the second local oscillator light enters the optical hybrid 909. The optical hybrid 908 performs optical hybridization on the first signal light and the first local oscillator light, and the optical hybrid 909 performs optical hybridization on the second signal light and the second local oscillator light. The optical hybrid 908 and the optical hybrid 909 may be spatial optical hybrids.

Optionally, the reflection assembly 1 905 may reflect the second signal light to input the second signal light to the optical hybrid 908, and the reflection assembly 2 906 may reflect the second local oscillator light to input the second local oscillator light to the optical hybrid 907.

Optionally, the polarization rotator may be a 90-degree polarization rotator.

Figure 10:
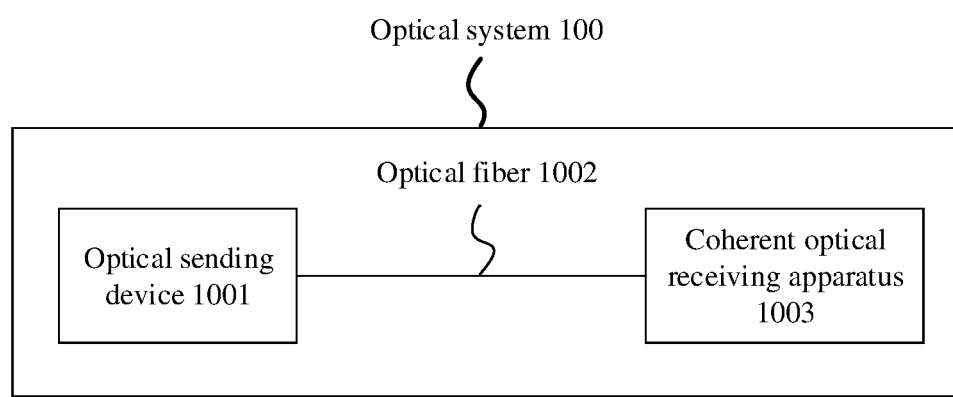
FIG. 10 is a schematic diagram of an optical system according to an embodiment of this application.

FIG. 10 is a schematic diagram of an optical system according to an embodiment of this application.

As shown in FIG. 10, the optical system 100 includes an optical sending device 1001, an optical fiber 1002, and a coherent optical receiving apparatus 1003. The coherent optical receiving apparatus 1003 receives, by using the optical fiber 1002, signal light sent by the optical sending device 1001. The coherent optical receiving apparatus 1003 receives local oscillator light by using the optical fiber 1002 or the coherent optical receiving apparatus 1003 generates the local oscillator light. The coherent optical receiving apparatus 1003 may be any coherent optical receiving apparatus in the foregoing embodiments.

For same or similar parts in embodiments of this application, refer to each other. In particular, the embodiments in FIG. 7 to FIG. 10 are extensions of the embodiments corresponding to FIG. 3 to FIG. 6. Therefore, descriptions are relatively simple. For related parts, refer to descriptions of the parts in the corresponding embodiments in FIG. 3 to FIG. 6.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A coherent optical receiving apparatus, comprising:
a polarization optical splitter;
a polarization controller;
an optical hybrid unit; and
a combiner, wherein the polarization optical splitter is connected to an input terminal of the optical hybrid unit, and an output terminal of the optical hybrid unit is connected to the combiner;
wherein the polarization optical splitter is configured to receive signal light and local oscillator light in any polarization mode, and is further configured to decompose the signal light into a plurality of beams of sub signal light, and is further configured to decompose the local oscillator light into a plurality of beams of sub local oscillator light;
wherein the optical hybrid unit is configured to obtain a plurality of beams of hybrid light by performing optical hybridization on the sub signal light and the sub local oscillator light;
wherein the combiner is configured to perform optical-to-electrical conversion on the plurality of beams of hybrid light to obtain and output a plurality of coherent electrical signals; and
wherein the polarization controller is configured to control polarization of the local oscillator light, so that a first digital signal processor (DSP) obtains service data based on the plurality of coherent electrical signals.

2. The coherent optical receiving apparatus according to claim 1, wherein the polarization optical splitter being configured to receive signal light and local oscillator light polarization mode, decompose the signal light, and decompose the local oscillator light comprises the polarization optical splitter being configured to:
receive the signal light in any polarization mode, and decompose the signal light into at least one beam of first sub signal light and at least one beam of second sub signal light, wherein the first sub signal light is in a first polarization mode, wherein and the second sub signal light is in a second polarization mode;
receive the local oscillator light in any polarization mode; and
decompose the local oscillator light into at least one beam of first sub local oscillator light and at least one beam of second sub local oscillator light, wherein the first sub local oscillator light is in the first polarization mode, and wherein the second sub local oscillator light is in the second polarization mode; and
wherein the optical hybrid unit being configured to obtain a plurality of beams of hybrid light by performing optical hybridization on the sub signal light and the sub local oscillator light, comprises optical hybrid unit being configured to:
perform optical hybridization on the first sub signal light and the first sub local oscillator light; and
obtain the plurality of beams of hybrid light by performing optical hybridization on the second sub signal light and the second sub local oscillator light.

3. The coherent optical receiving apparatus according to claim 2, wherein the polarization controller comprises a plurality of first beam splitters (BS), a phase modulator, a first optical-to-electrical converter, and a signal processor;
wherein the plurality of first BSs are configured to:
obtain a part of the local oscillator light through coupling; and
obtain a plurality of beams of optical supervisory signals by performing beam splitting;
wherein the first optical-to-electrical converter is configured to convert the optical supervisory signals into electrical supervisory signals; and
wherein the signal processor is configured to generate feedback control electrical signals based on the electrical supervisory signals, wherein the feedback control electrical signals are used to control the phase modulator to adjust the polarization of the local oscillator light, so that the first DSP obtains the service data based on the plurality of coherent electrical signals.

4. The coherent optical receiving apparatus according to claim 3, wherein the signal processor comprises a second digital signal processor (DSP), a digital-to-analog converter (DAC), and a power amplifier;
wherein the second DSP is configured to generate the feedback control electrical signals based on the electrical supervisory signals;
wherein the DAC is configured to perform digital-to-analog conversion on the feedback control electrical signals; and
wherein the power amplifier is configured to perform power amplification on the feedback control electrical signals on which digital-to-analog conversion is performed.

5. The coherent optical receiving apparatus according to claim 2, wherein the polarization optical splitter comprises a first polarization splitter and rotator (PSR), a second PSR, a second beam splitter (BS), a third BS, a fourth BS, and a fifth BS;
wherein the first PSR is configured to decompose the signal light into first signal light and second signal light, wherein the first signal light is in the first polarization mode, and the second signal light is in the second polarization mode;
wherein the second BS is configured to equally divide the first signal light into two beams of the first sub signal light; and
wherein the third BS is configured to equally divide the second signal light into two beams of the second sub signal light; and
wherein the second PSR is configured to decompose the local oscillator light into first local oscillator light and second local oscillator light, wherein the first local oscillator light is in the first polarization mode, and the second local oscillator light is in the second polarization mode;
wherein the fourth BS is configured to equally divide the first local oscillator light into two beams of the first sub local oscillator light; and
wherein the fifth BS is configured to equally divide the second local oscillator light into two beams of the second sub local oscillator light.

6. The coherent optical receiving apparatus according to claim 5, wherein the polarization controller is configured to adjust a polarization delay angle of at least one of the first local oscillator light or the second local oscillator light, so that the first DSP obtains the service data based on the plurality of coherent electrical signals.

7. The coherent optical receiving apparatus according to claim 2, wherein the polarization optical splitter comprises a first beam splitter (BS), a second BS, a first PSR, a second PSR, a third PSR, and a fourth PSR;
wherein the first BS is configured to equally divide the signal light into first signal light and second signal light;

wherein the first PSR is configured to decompose the first signal light into one beam of the first sub signal light and one beam of the second sub signal light; and wherein the second PSR is configured to decompose the second signal light into another beam of the first sub signal light and another beam of the second sub signal light;

wherein the second BS is configured to decompose the local oscillator light into first local oscillator light and second local oscillator light;

wherein the third PSR is configured to decompose the first local oscillator light into one beam of the first sub local oscillator light and one beam of the second sub local oscillator light; and wherein the fourth PSR is configured to decompose the second local oscillator light into another beam of the first sub local oscillator light and another beam of the second sub local oscillator light.

8. The coherent optical receiving apparatus according to claim 7, wherein the polarization controller comprises a plurality of third BSs, a phase modulator, an optical-to-electrical converter, and a signal processor;

wherein the plurality of third BSs are configured to obtain a part of the local oscillator light through coupling and perform beam splitting to obtain a plurality of beams of optical supervisory signals;

wherein the optical-to-electrical converter is configured to convert the optical supervisory signals into electrical supervisory signals; and wherein the signal processor is configured to generate feedback control electrical signals based on the electrical supervisory signals, wherein the feedback control electrical signals are used to control the phase modulator to adjust the polarization of the local oscillator light, so that the first DSP obtains the service data based on the plurality of coherent electrical signals.

9. The coherent optical receiving apparatus according to claim 8, wherein the polarization controller further comprises a third PSR and a first polarization rotator and combiner (PRC), and an output terminal of the first PRC is connected to an input terminal of the second BS;

wherein the third PSR is configured to receive the local oscillator light and decompose the local oscillator light into third local oscillator light and fourth local oscillator light, wherein the third local oscillator light is in the first polarization mode, and wherein the fourth local oscillator light is in the second polarization mode;

wherein the plurality of third BSs being configured to obtain the part of the local oscillator light and perform beam splitting comprises the plurality of third BSs being configured to separately obtain the part of the local oscillator light from the third local oscillator light and the fourth local oscillator light through division, and perform beam splitting to obtain the plurality of beams of optical supervisory signals; and wherein that the feedback control electrical signals being used to control the phase modulator to adjust the polarization of the local oscillator light comprises the feedback control electrical signals being used to control the phase modulator to adjust a phase of the third local oscillator light or the fourth local oscillator light, so that the first DSP obtains the service data based on the plurality of coherent electrical signals; and wherein the first PRC is configured to perform polarization beam combination on the third local oscillator light and the fourth local oscillator light that pass through the third BS.

10. The coherent optical receiving apparatus according to claim 2, wherein the optical hybrid unit comprises at least one optical hybrid, and wherein the optical hybrid comprises a first optical splitter, a second optical splitter, a third optical splitter, a fourth optical splitter, and a 90-degree phase shifter;

wherein the first optical splitter is configured to equally divide one beam of the first sub signal light into two beams of first beam-split sub signal light, and the third optical splitter is configured to equally divide one beam of the first sub local oscillator light into two beams of first beam-split sub local oscillator light;

wherein the 90-degree phase shifter is configured to phase-shift one beam of the first beam-split sub local oscillator light by 90 degrees;

wherein the second optical splitter is configured to: combine one beam of the first beam-split sub signal light with one beam of the first beam-split sub local oscillator light, and then output two beams of hybrid light; and wherein the fourth optical splitter is configured to combine the other beam of the first beam-split sub signal light with the first beam-split sub local oscillator light on which 90-degree phase shift is performed, and is further configured to output two other beams of hybrid light.

11. The coherent optical receiving apparatus according to claim 1, wherein the polarization optical splitter comprises a first optical fiber collimator, a second optical fiber collimator, a first lens, a second lens, a reflection assembly, and a polarization rotator; and wherein the first optical fiber collimator is configured to receive and collimate the signal light;

wherein the second optical fiber collimator is configured to receive and collimate the local oscillator light;

wherein the first lens is configured to divide the signal light into first sub signal light and second sub signal light;

wherein the second lens is configured to divide the local oscillator light into first sub local oscillator light and second sub local oscillator light, and wherein the polarization rotator is configured to perform polarization rotation on the second sub local oscillator light; and wherein the reflection assembly comprises a plurality of reflectors, and the reflection assembly is configured to reflect at least one of the first sub signal light, the second sub signal light, the first sub local oscillator light, or the second sub local oscillator light to the optical hybrid unit.

12. The coherent optical receiving apparatus according to claim ii, wherein the optical hybrid unit comprises a first optical hybrid and a second optical hybrid;

wherein the first optical hybrid is configured to perform optical hybridization on the first sub signal light and the first sub local oscillator light, and wherein the second optical hybrid is configured to perform optical hybridization on the second sub signal light and the second sub local oscillator light that is subject to polarization rotation; and wherein the first optical hybrid and the second optical hybrid are further configured to output the plurality of beams of hybrid light.

13. The coherent optical receiving apparatus according to claim 1, wherein the combiner comprises a plurality of second polarization rotator and combiners (PRCs) and a plurality of second optical-to-electrical converters;

wherein the second PRCs are configured to perform beam combination on two of the plurality of beams of hybrid light; and wherein the plurality of second optical-to-electrical converters are configured to convert, into the plurality of coherent electrical signals, a plurality of beams of the hybrid light on which the second PRCs perform beam combination.

14. The coherent optical receiving apparatus according to claim 1, wherein the combiner comprises a third optical-to-electrical converter, and the third optical-to-electrical converter comprises a plurality of photonic detectors (PD), a plurality of electrical domain adders/subtracters, a plurality of trans-impedance amplifiers (TIA), and a plurality of analog-to-digital converters (ADCs);

wherein PDs of the plurality of PDs are configured to convert the plurality of beams of hybrid light into a plurality of beams of hybrid electrical signals;

wherein the plurality of electrical domain adders/subtracters are configured to combine the plurality of beams of hybrid electrical signals to obtain the plurality of coherent electrical signals;

wherein TIAs of the plurality of TIAs are configured to amplify the plurality of coherent electrical signals; and wherein the ADCs are configured to perform analog-to-digital conversion on the plurality of coherent electrical signals.

15. An optical system, comprising:
an optical sending device;
an optical fiber; and
a coherent optical receiving apparatus, wherein the coherent optical receiving apparatus comprises:
 a polarization optical splitter;
 a polarization controller;
 an optical hybrid unit; and
 a combiner, wherein the polarization optical splitter is connected to an input terminal of the optical hybrid unit, and an output terminal of the optical hybrid unit is connected to the combiner;

wherein the polarization optical splitter is configured to receive signal light and local oscillator light in any polarization mode, is further configured to decompose the signal light into a plurality of beams of sub signal light, and is further configured to decompose the local oscillator light into a plurality of beams of sub local oscillator light;

wherein the optical hybrid unit is configured to perform optical hybridization on the sub signal light and the sub local oscillator light, to obtain a plurality of beams of hybrid light;

wherein the combiner is configured to obtain and output a plurality of coherent electrical signals by performing optical-to-electrical conversion on the plurality of beams of hybrid light; and wherein the polarization controller is configured to control polarization of the local oscillator light, so that a first digital signal processor (DSP) obtains service data based on the plurality of coherent electrical signals;

wherein the coherent optical receiving apparatus receives, by using the optical fiber, signal light sent by the optical sending device; and wherein the coherent optical receiving apparatus receives local oscillator light or the coherent optical receiving apparatus generates the local oscillator light specifically comprises:

wherein the coherent optical receiving apparatus at least one of receives, by using the optical fiber, the local oscillator light sent by the optical sending device, or generates the local oscillator light.

16. The optical system according to claim 15, wherein the polarization optical splitter is configured to:
receive the signal light in any polarization mode; and
decompose the signal light into at least one beam of first sub signal light and at least one beam of second sub signal light, wherein the first sub signal light is in a first polarization mode, and wherein the second sub signal light is in a second polarization mode; and wherein the polarization optical splitter is configured to:
receive the local oscillator light in any polarization mode; and
decompose the local oscillator light into at least one beam of first sub local oscillator light and at least one beam of second sub local oscillator light, wherein the first sub local oscillator light is in the first polarization mode, and the second sub local oscillator light is in the second polarization mode; and wherein the optical hybrid unit is configured to:
perform optical hybridization on the first sub signal light and the first sub local oscillator light; and
perform optical hybridization on the second sub signal light and the second sub local oscillator light to obtain the plurality of beams of hybrid light.

17. The optical system according to claim 16, wherein the polarization controller comprises a plurality of first beam splitters (BS), a phase modulator, a first optical-to-electrical converter, and a signal processor;

wherein the plurality of first BSs are configured to obtain a part of the local oscillator light through coupling and perform beam splitting to obtain a plurality of beams of optical supervisory signals;

wherein the first optical-to-electrical converter is configured to convert the optical supervisory signals into electrical supervisory signals; and wherein the signal processor is configured to generate feedback control electrical signals based on the electrical supervisory signals, wherein the feedback control electrical signals are used to control the phase modulator to adjust the polarization of the local oscillator light, so that the first DSP obtains the service data based on the plurality of coherent electrical signals.

18. The optical system according to claim 16, wherein the polarization optical splitter comprises a first polarization splitter and rotator (PSR), a second PSR, a second beam splitter (BS), a third BS, a fourth BS, and a fifth BS;

wherein the first PSR is configured to decompose the signal light into first signal light and second signal light, wherein the first signal light is in the first polarization mode, and the second signal light is in the second polarization mode;

wherein the second BS is configured to equally divide the first signal light into two beams of the first sub signal light; and wherein the third BS is configured to equally divide the second signal light into two beams of the second sub signal light;

wherein the second PSR is configured to decompose the local oscillator light into first local oscillator light and second local oscillator light, wherein the first local oscillator light is in the first polarization mode, and the second local oscillator light is in the second polarization mode;

wherein the fourth BS is configured to equally divide the first local oscillator light into two beams of the first sub local oscillator light; and wherein the fifth BS is configured to equally divide the second local oscillator light into two beams of the second sub local oscillator light.

19. The optical system according to claim 18, wherein the polarization controller is configured to adjust a polarization delay angle of at least one of the first local oscillator light or the second local oscillator light, so that the first DSP obtains the service data based on the plurality of coherent electrical signals.

20. The optical system according to claim 16, wherein the polarization optical splitter comprises a first beam splitter (BS), a second BS, a first polarization splitter and rotator (PSR), a second PSR, a third PSR, and a fourth PSR;

wherein the first BS is configured to equally divide the signal light into first signal light and second signal light;

wherein the first PSR is configured to decompose the first signal light into one beam of the first sub signal light and one beam of the second sub signal light; and wherein the second PSR is configured to decompose the second signal light into another beam of the first sub signal light and another beam of the second sub signal light;

wherein the second BS is configured to decompose the local oscillator light into first local oscillator light and second local oscillator light;

wherein the third PSR is configured to decompose the first local oscillator light into one beam of the first sub local oscillator light and one beam of the second sub local oscillator light; and wherein the fourth PSR is configured to decompose the second local oscillator light into another beam of the first sub local oscillator light and another beam of the second sub local oscillator light.

* * * * *